United States Patent [19]

Anderson, Jr.

[11] Patent Number: 4,796,896
[45] Date of Patent: Jan. 10, 1989

[54] MULTI-STAGE ELASTOMERIC SEAL WITH RETAINER

[75] Inventor: Russell C. Anderson, Jr., N. Tonawanda, N.Y.

[73] Assignee: General Motors Corporation, Detroit, Mich.

[21] Appl. No.: 156,344

[22] Filed: Feb. 16, 1988

[51] Int. Cl.⁴ .............................................. B65D 53/00
[52] U.S. Cl. ................................ 277/181; 277/188 R; 277/189
[58] Field of Search ............... 277/181, 182, 183, 184, 277/185, 186, 53–57, 3, 101, 138, 165, 166, 189, 237 R, DIG. 3, 236, 12, 180, 4, 74, 188 R

[56] References Cited

U.S. PATENT DOCUMENTS

| | | | |
|---|---|---|---|
| 2,994,571 | 8/1961 | Peras | 277/181 |
| 3,278,883 | 10/1966 | Lipsey | 277/181 |
| 4,132,416 | 1/1979 | Adams, Jr. | 277/74 |
| 4,298,203 | 11/1981 | Holser et al. | 277/181 |
| 4,580,792 | 4/1986 | Barlaud et al. | 277/181 |
| 4,609,773 | 9/1986 | Brown et al. | 277/181 |
| 4,635,715 | 1/1987 | Andersson | 277/181 |
| 4,744,572 | 5/1988 | Sahba et al. | 277/236 |

OTHER PUBLICATIONS

Parker Seal Company Drawing No. 002, Hose Flangle Seal, 3-1987.
Parker Seal Company Drawing No. 005, Cooling Water Flange Seal, 3-1987.

Primary Examiner—William A. Cuchlinski, Jr.
Assistant Examiner—Petar Arsenovic
Attorney, Agent, or Firm—R. L. Phillips

[57] ABSTRACT

A two-stage elastomeric refrigerant seal has a seal body with a primary seal adapted for low compression and a secondary seal section adapted for high compression. The seal body is secured to a retainer in an arrangement such that the secondary seal provides pressure assisted sealing on the seal body from the sealed gas acting on the primary seal and in addition provides physical shielding of the primary seal from the refrigerant and any contaminants therein.

3 Claims, 1 Drawing Sheet

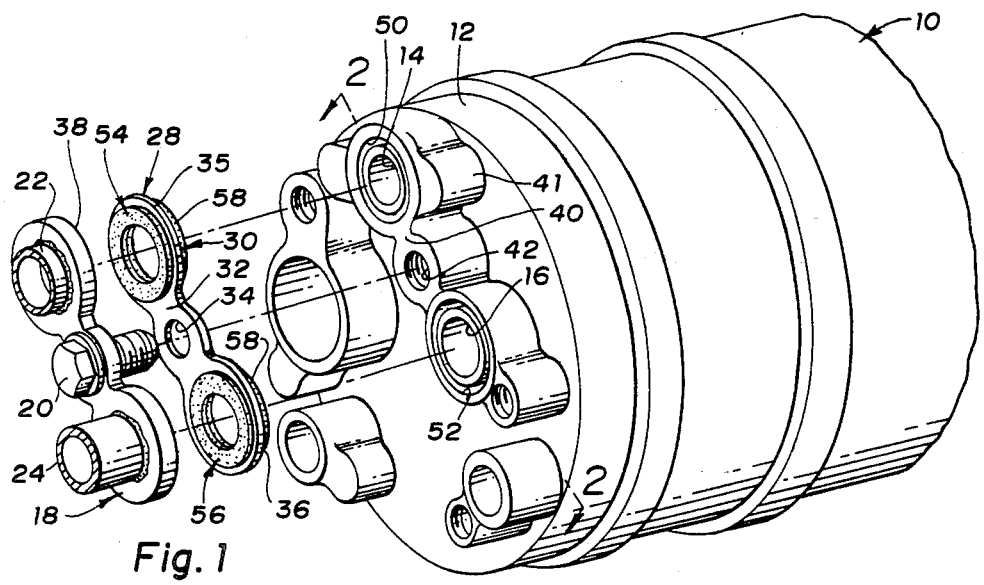
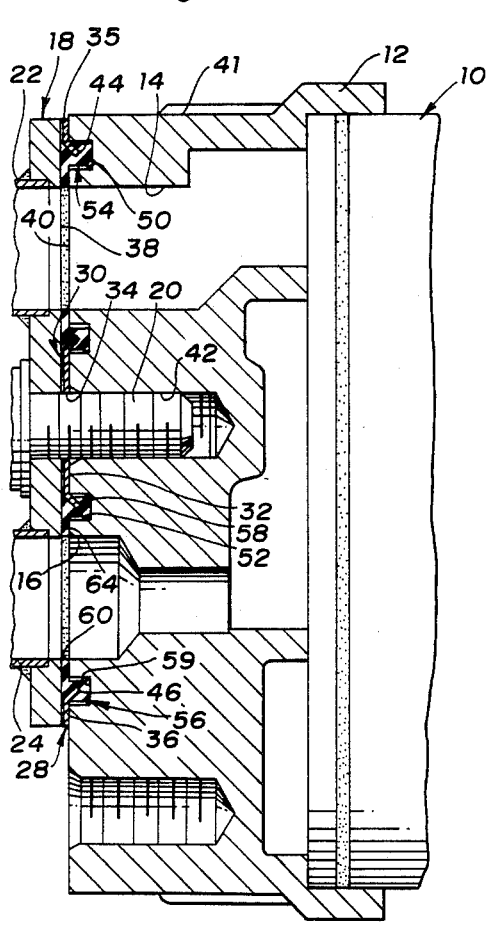
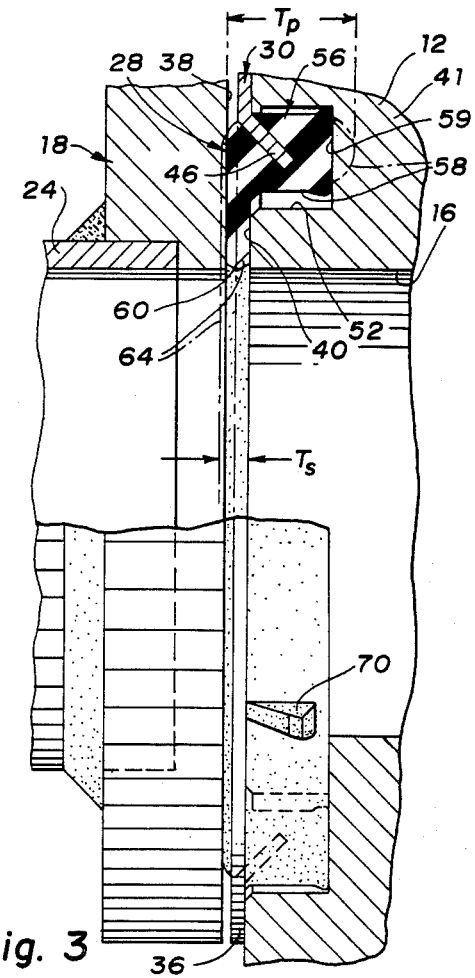
Fig. 1
Fig. 2
Fig. 3

MULTI-STAGE ELASTOMERIC SEAL WITH RETAINER

TECHNICAL FIELD

This invention relates to elastomeric seals and more particularly to a multi-stage elastomeric seal with retainer particularly adaptable to sealing a joint in a refrigerant or air conditioning system.

BACKGROUND OF THE INVENTION

In refrigerant and air conditioning systems, it is common practice to employ simple O-rings to seal the various joints therein such as at the compressor, condenser, evaporator and in the line fittings as well. However, it has been proposed at least in the case of automotive air conditioning systems, that a one piece seal composed of elastomeric material such as rubber molded to a metallic or plastic retainer and commonly known as an "integral" seal be substituted for the conventional O-ring. However, tests on current state of the art integral seals have shown unsatisfactory performance with respect to Freon containment due to Freon leakage around the sealing surfaces and permeation of the Freon gas through the elastomer via defusion mechanisms.

SUMMARY OF THE INVENTION

The present invention overcomes these problems with a two-stage elastomeric integral seal having a primary or main sealing section that is molded to a retainer and designed with a low compression (e.g. about 25%) so as to maintain an acceptable balance of compression and volume swell for long term durability. And a secondary seal section, in the form of a molded annular lip, is integrally added upstream of the primary seal section. This secondary seal is designed to provide: (1) a labyrinth seal effect by greatly increasing the distance between the sealed fluid, e.g. high pressure Freon, and the environment, (2) a much higher compression (e.g. about 60%) to increase peripheral contact pressure and reduce leakage due to permeation, (3) the formation of a pressure-assisted seal in that pressure on the end of the secondary seal tends to wedge the elastomer into the annular space, and (4) physical shielding of the primary seal from the sealed fluid (e.g. hot Freon gas and any contaminants therein such as where the seal is employed at the discharge compressor).

An object of the present invention is thus to provide a new and improved multi-stage elastomeric seal.

Another object is to provide both a primary seal and a secondary seal bonded to a retainer and wherein the secondary seal has substantially higher compression than the primary seal and shields the latter from the fluid being sealed.

Another object is to provide a two-stage elastomeric refrigerant seal for use in an air conditioning system wherein a primary seal bonded to a rigid retainer provides a typical O-ring sealing effect while a secondary seal molded with the primary seal operates upstream of the latter and has a much higher compression so as to reduce leakage due to permeation while also forming a pressure assist tending to wedge the primary seal in the annular space as well as providing physical shielding of the primary seal from the air conditioning system gas and any contaminants therein.

These and other objects, advantages and features of the present invention will become more apparent from the following description and drawing in which:

BRIEF DESCRIPTION OF DRAWINGS

FIG. 1 is an exploded view of one end of a motor vehicle air conditioning system compressor including a two-stage elastomeric integral seal according to the present invention.

FIG. 2 is an enlarged sectional view taken on the line 2—2 in FIG. 1.

FIG. 3 is an enlarged sectional view of one of the sealed joints in FIG. 2.

DETAILED DESCRIPTION OF PREFERRED EMBODIMENT

Referring to FIG. 1, there is shown a motor vehicle air conditioning compressor 10 of the kind disclosed in U.S. Pat. No. 4,360,321 assigned to the assignee of this invention and which is hereby incorporated by reference. For purposes of the present invention, it is sufficient to know that such compressor includes a rear head 12 having both a suction passage or port 14 and a discharge port or passage 16 by which refrigerant is respectively delivered to and discharged from the compressor relative to the other components of the motor vehicle air conditioning system. The connection of the compressor with the system is provided by a fitting 18 that is secured by a bolt 20 to the rear head and has a suction pipe 22 and discharge pipe 24 which must be sealingly connected to the respective suction port 14 and discharge port 16 in the rear cylinder head.

A dual two-stage elastomeric integral seal 28 according to the present invention provides for the sealing of both the suction and discharge ports of the fitting and comprises a rigid retainer member 30 made of either metal or plastic. The retainer 30 for purposes of the dual sealing function has a generally figure-eight configuration comprising a flat midsection 32 having a hole 34 therethrough for accommodating the bolt securing the fitting to the rear head. A flat annular section 35 and 36 extends from the opposite ends of the midsection and about the respective suction and discharge ports 14 and 16 and is adapted to be directly contacted and clamped by the joint parts as seen in FIGS. 2 and 3, i.e. the overall flat portion of the retainer not covered by the seal body as later described is retained by and between the flat inner side 38 of the fitting 18 and a correspondingly shaped flat surface 40 on a boss 41 on the rear head that accommodates the discharge and suction ports as well as a threaded hole 42 for the bolt 20. The rigid seal retainer further has conical sections 44 and 46 of uniform thickness integral with and extending radially inward and axially of the respective flat sections 35 and 36. The conical retainer sections 35 and 36 are adapted to extend into an annular flat bottom grooves 50 and 52 formed in the rear head boss 41 about the respective suction port 14 and discharge port 16.

Seal bodies 54 and 56 formed of an elastomeric material such as rubber sandwich and are bonded to the respective conical retainer sections 44 and 46. Each seal body extends about the inner diameter of the respective conical section and as shown in the enlargement of the one seal body 56 in FIG. 3 has an annular primary seal section 58 of semi-oval cross-section adapted to extend about the respective port 16 and be received in the associated groove 52 and be directly contacted and squeezed by the flat bottom 59 of the groove and the flat side 38 of the fitting 18. Each seal body further has an annular secondary seal section 64 of semi-oval cross-section adapted to extend about the respective port 16 and be directly contacted and squeezed by the joint parts. The primary seal section 58 has a thickness $T_p$ substantially greater than the thickness $T_s$ of the secondary seal section 64 thereby to effect substantially greater compression of the secondary seal section than of the primary seal section and obtain improved sealing on squeezing of the seal body 56 by the joint parts, such compressions being limited and thereby controlled (given the $T_p$ and $T_s$ dimensions) by the direct contact of the flat retainer section with the joint parts with the thickness of the retainer thus effective a predetermined space between the parts for the seal body. It was found that by providing the primary or main sealing section with a compression of approximately 25%, there was maintained an acceptable balance of compression set and volume swell for long term durability. On the other hand, the secondary seal section was then provided with a much higher compression of approximately 60% resulting in increased peripheral contact pressure and reduced leakage due to permeation as compared with a conventional O-ring. Moreover, the arrangement of the secondary seal section effects a greater increase in the distance between the sealed fluid (e.g. high pressure Freon at the discharge port) and the formation of a pressure-assisted seal in that pressure on the inner end 60 of the secondary seal section then tends to wedge the elastomer into the annular space between the joint ports including the main seal body groove. Moreover, both the secondary seal section and the joint groove cooperatively provide physical sealing of the primary seal section from the refrigerant and any contaminants therein which is particularly important as concerns the hot Freon gas being transmitted through the discharge port.

An additional feature resides in the provision of a plurality of spline-like projections 70 which are formed on and spaced about the outer diameter of each primary seal section and are adapted to engage the outer diameter of the respective grooves 50 and 52 to retain the dual seal in place prior to attachment of the fitting 18 with the bolt 20. This is particularly advantageous in automatic assembly as both seals are thereby firmly held in position for final assembly of the fitting 18 without need of a separate retainer or assembly fixture.

The foregoing description of the preferred embodiment of the invention has been presented in a dual arrangement for purposes of illustration and description. It is not intended to be exhaustive or to limit the invention to the precise form disclosed as the invention is equally applicable to sealing one or more than two such ports or passages. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A two-stage elastomeric seal for sealing a passage extending through two parts that form a joint, said seal comprising a rigid retainer having a first annular section adapted to extend about said passage and be directly contacted and clamped by said joint parts thereby to be retained and effect a predetermined space between said joint parts, said rigid retainer further having a second annular section integral with and extending radially inward and axially of said first annular section and adapted to extend into an annular groove in one of said joint parts, an annular elastomeric seal body sandwiching and bonded to said second annular section, said seal body having an annular primary seal section adapted to extend about said passage and be received in said annular groove and be directly contacted and squeezed by the bottom of said groove and an annular surface on the other of said joint parts, said seal body further having an annular secondary seal section adapted to extend about said passage and be directly contacted and squeezed by said joint parts, and said primary seal section having a cross section with a thickness substantially greater than that of said secondary seal section thereby to effect substantially higher compression of said secondary seal section than of said primary seal section on squeezing of said seal body by said joint parts.

2. A two-stage elastomeric seal for sealing a passage extending through two parts that form a joint, said seal comprising a rigid retainer of uniform thickness having a flat annular section adapted to extend about said passage and be directly contacted and clamped by said joint parts thereby to be retained and effect a predetermined space between said joint parts, said rigid retainer further having a conical section integral with and extending radially inward and axially of said flat section and adapted to extend into an annular flat bottom groove in one of said joint parts, an annular elastomeric seal body sandwiching and bonded to said conical section, said seal body having an annular primary seal section of oval cross section adapted to extend about said passage and be received in said annular groove and be directly contacted and squeezed by the flat bottom of said groove and a flat annular section on the other of said joint parts, said seal body further having a flat annular secondary seal section of semi-oval cross section adapted to extend about said passage and be directly contacted and squeezed by said joint parts, and said primary seal section having a cross section with a thickness substantially greater than that of said secondary seal section thereby to effect substantially higher compression of said secondary seal section than of said primary seal section on squeezing of said seal body by said joint parts.

3. A two-stage elastomeric refrigerant seal for sealing a refrigerant passage extending through two parts that form a joint in a refrigerant system, said seal comprising a rigid retainer of uniform thickness having a flat annular section adapted to extend about said passage and be directly contacted and clamped by said joint parts thereby to be retained and effect a predetermined space between said joint parts, said rigid retainer further having a conical section of uniform thickness integral with and extending radially inward and axially of said flat section and adapted to extend into an annular flat bottom groove in one of said joint parts, an annular elastomeric seal body sandwiching and bonded to said conical section, said seal body having an annular primary seal section adapted to extend about said passage and be received in said annular groove and be directly contacted and squeezed by the flat bottom of said groove and a flat annular section on the other of said joint parts, said seal body further having a flat annular secondary seal section adapted to extend about said passage and be directly contacted and squeezed by said joint parts, and said primary seal section having a cross section with a thickness substantially greater than that of said secondary seal section thereby to effect substantially higher compression of said secondary seal section than of said primary seal section on squeezing of said seal body by said joint parts and wherein refrigerant pressure in the passage acting on an inner end of said secondary seal section tends to wedge the seal body into said groove while said secondary seal section and said groove cooperatively provide physically sealing of said primary seal section from said refrigerant and any contaminants therein.

* * * * *